US010891305B2

(12) United States Patent
Allman et al.

(10) Patent No.: US 10,891,305 B2
(45) Date of Patent: *Jan. 12, 2021

(54) SYNCHRONIZATION OF DATA BETWEEN SYSTEMS

(71) Applicant: International Business Machines Corporation, Armonk, NY (US)

(72) Inventors: Mark Allman, Southampton (GB); David C. Illsley, Dundee (GB); Christopher E. Sharp, Winchester (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/409,781

(22) Filed: May 11, 2019

(65) Prior Publication Data

US 2019/0266173 A1 Aug. 29, 2019

Related U.S. Application Data

(63) Continuation of application No. 14/673,422, filed on Mar. 30, 2015, now Pat. No. 10,331,697, which is a
(Continued)

(30) Foreign Application Priority Data

Feb. 24, 2011 (EP) ..................................... 11155814

(51) Int. Cl.
*G06F 16/27* (2019.01)
*G06F 16/23* (2019.01)
(Continued)

(52) U.S. Cl.
CPC .......... *G06F 16/27* (2019.01); *G06F 16/2365* (2019.01); *G06F 16/273* (2019.01); *H04L 67/02* (2013.01); *G06F 16/178* (2019.01)

(58) Field of Classification Search
CPC .................................................. G06F 16/2365
See application file for complete search history.

(56) References Cited

U.S. PATENT DOCUMENTS 5,898,838 A 4/1999 Wagner
7,308,646 B1 12/2007 Cohen et al.
(Continued)

FOREIGN PATENT DOCUMENTS

EP 1873958 A1 1/2008

OTHER PUBLICATIONS

IBM Technical Data Bulletin, "A Rest based data synchronization protocol," [online] IP.Com, IPCOM000184275D, Jun. 18, 2009, 2 pgs.
(Continued)

*Primary Examiner* — Charles E Lu
(74) *Attorney, Agent, or Firm* — Cuenot, Forsythe & Kim, LLC

(57) ABSTRACT

A computer hardware system for synchronization of data between a first data system and a second data system includes an event propagation processor. Both data systems are modeled as a collection of representation state transfer (REST) resources. The event propagation processor is configured to integrate data between the first and second data systems for events about data changes in the data systems. The processor includes an adaptation layer in the form of an HTTP (Hypertext Transfer Protocol) facade to represent REST resources. The adaptation layer includes a provider component configured to provide access to data resources in one of the data systems, and an initiator component config-
(Continued)

ured to emit events corresponding to data changes in one of the data systems.

20 Claims, 15 Drawing Sheets

Related U.S. Application Data continuation of application No. 13/363,829, filed on Feb. 1, 2012, now Pat. No. 9,047,358.

(51) Int. Cl.
*H04L 29/08* (2006.01)
*G06F 16/178* (2019.01)

(56) References Cited

U.S. PATENT DOCUMENTS

| | | | |
|---|---|---|---|
| 9,047,358 B2 | 6/2015 | Allman et al. | |
| 9,462,056 B1 | 10/2016 | Protopopov | |
| 2002/0038350 A1 | 3/2002 | Lambert et al. | |
| 2004/0260710 A1 | 12/2004 | Marston | |
| 2006/0089539 A1 | 4/2006 | Miodownik | |
| 2009/0193393 A1 | 7/2009 | Baldwin et al. | |
| 2009/0198702 A1 | 8/2009 | Novik et al. | |
| 2009/0201338 A1 | 8/2009 | Weaver et al. | |
| 2010/0070470 A1 | 3/2010 | Milencovici et al. | |
| 2010/0082732 A1 | 4/2010 | Guenther et al. | |
| 2010/0153423 A1 | 6/2010 | Lu et al. | |
| 2012/0221522 A1 | 8/2012 | Allman et al. | |
| 2015/0205852 A1 | 7/2015 | Allman et al. | |

OTHER PUBLICATIONS

Al-Zoubi, K., et al., "Performing distributed simulation with Restful Web-Services" In Proc. 2009 Winter Simulation Conf. WSC '09, retrieved from the Internet: <http://cell-devs.sce.carleton.ca/publications/2009/AW09a/WSC2009_REST_Final.pdf>, 12 pgs.

Khare, R., et al.,"Extending the Representational State Transfer (REST) architectural style for decentralized systems" Univ. Calif. ISR Technical Report UCI-ISR-03-08 (Oct. 2003) retrieved from the Internet: <http://www.isr.uci.edu/tech_reports/UCI-ISR-03-8.pdf>, 13 pgs.

PCT Application PCT/IB2012/050412 International Search Report and Written Opinion, dated May 31, 2012.

U.S. Appl. No. 13/363,829, Non-Final Office Action, dated Oct. 3, 2014, 13 pg.

U.S. Appl. No. 13/363,829, Notice of Allowance, dated Jan. 30, 2015, 5 pg.

U.S. Appl. No. 14/673,422, Non-Final Office Action, dated Sep. 11, 2015, 10 pg.

U.S. Appl. No. 14/673,422, Final Office Action, dated Mar. 9, 2065, 15 pg.

U.S. Appl. No. 14/673,422, Non-Final Office Action, dated Nov. 15, 2017, 11 pg.

U.S. Appl. No. 14/673,422, Final Office Action, dated Apr. 2, 2018, 13 pg.

U.S. Appl. No. 14/673,422, Non-Final Office Action, dated Oct. 4, 2018, 13 pg.

U.S. Appl. No. 14/673,422, Examiner's Answer, Nov. 21, 2016, 7 pg.

U.S. Appl. No. 14/673,422, Decision on Appeal, Aug. 24, 2017, 14 pg.

U.S. Appl. No. 14/673,422, Notice of Allowance, dated Feb. 7, 2019, 5 pg.

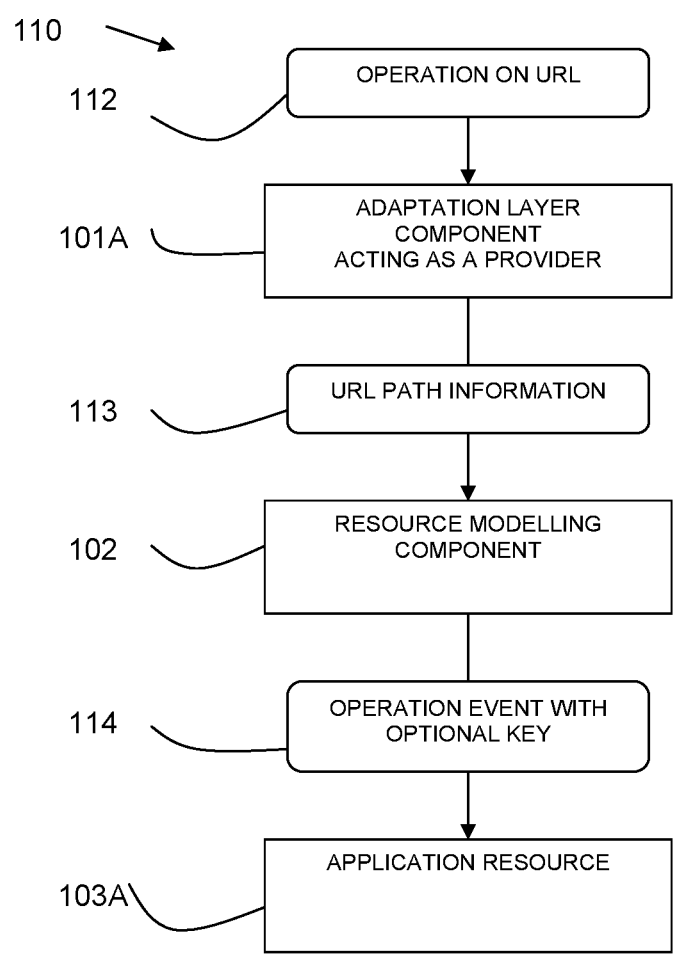

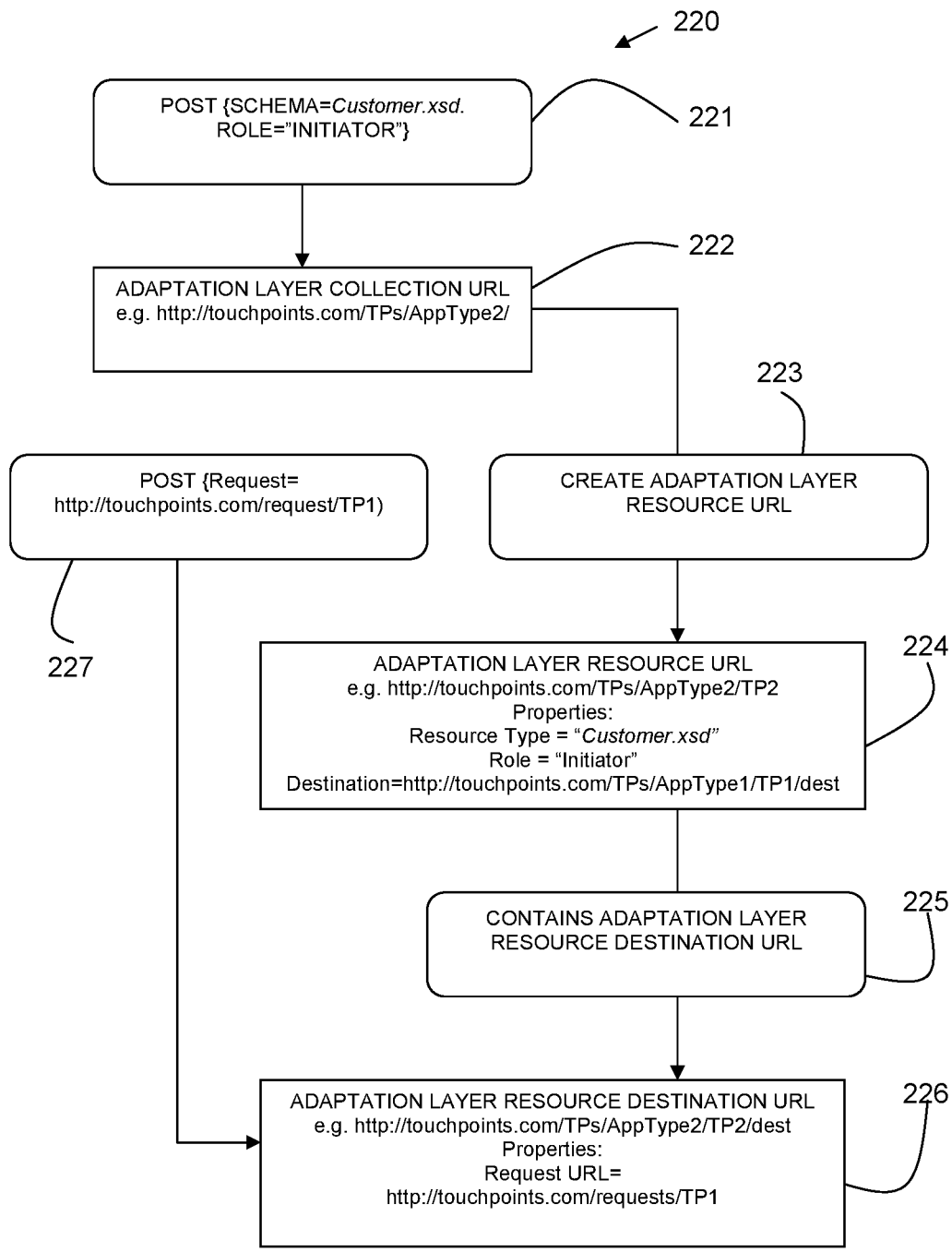

SYNCHRONIZATION OF DATA BETWEEN SYSTEMS

CROSS-REFERENCE TO RELATED APPLICATIONS

This application is a Continuation of U.S. application Ser. No. 14/673,422, filed on Mar. 30, 2015, which is a Continuation of U.S. application Ser. No. 13/363,829, filed on Feb. 1, 2012, which claims the benefit of European Application Number EP 11155814.4 filed on Feb. 24, 2011, which is incorporated herein by reference in its entirety.

BACKGROUND OF THE INVENTION

Field of the Invention

The present invention relates to synchronization of data between systems, and more specifically, to the use of REST (Representational State Transfer) resources to synchronize data between systems.

Description of the Related Art

A common application integration scenario is the synchronization of data from one system to another, or the propagation of business objects from one system to another. The usual issues with integration are protocol adaptation and data schema transformation.

A situation, that is usually dealt with at the application or mediation level, is primary key mapping between data stored in one system and the other, i.e., how the data is known and indexed between systems. The usual mechanism for addressing this is for one system (the controlled system) to have data stored with a foreign key, and this foreign key is the primary key on the other system (the controlling system).

Typically, an integration requires either some external key mapping technology to map between primary keys on each system, or the controlled system is directly addressable using the foreign key. However, in the latter case, the controlled system will not have that foreign key when a record is originating in it and is to be propagated to the controlling system, so a further update of the original record on the controlled system is required after it has been created on the controlling system to tie these two keys together at the controlled system.

The vagaries of these different approaches, at the protocol, formatting and key mapping levels, all lead to complex integration processes that understand these specifics and encode the necessary approach in the mediation between the systems based on knowledge of these systems. This leads to system specific integration logic, or very complex general purpose integration logic. The integration specifics become even more difficult when these issues are coupled with integrating systems that may reside on-premise, in a public, or private cloud.

BRIEF SUMMARY

In certain aspects, a computer hardware system for synchronization of data between a first data system and a second data system includes an event propagation processor. Both data systems are modeled as a collection of representation state transfer (REST) resources. The event propagation processor is configured to integrate data between the first and second data systems for events about data changes in the data systems. The processor includes an adaptation layer in the form of an HTTP (Hypertext Transfer Protocol) facade to represent REST resources. The adaptation layer includes a provider component configured to provide access to data resources in one of the data systems, and an initiator component configured to emit events corresponding to data changes in one of the data systems.

BRIEF DESCRIPTION OF THE SEVERAL VIEWS OF THE DRAWINGS

FIGS. 1A to 1C are schematic flow diagrams of adaptation layer components of a data synchronization system.

FIGS. 2A to 2C are schematic flow diagrams showing adaptation layer component operations.

DETAILED DESCRIPTION

Figure 1B:
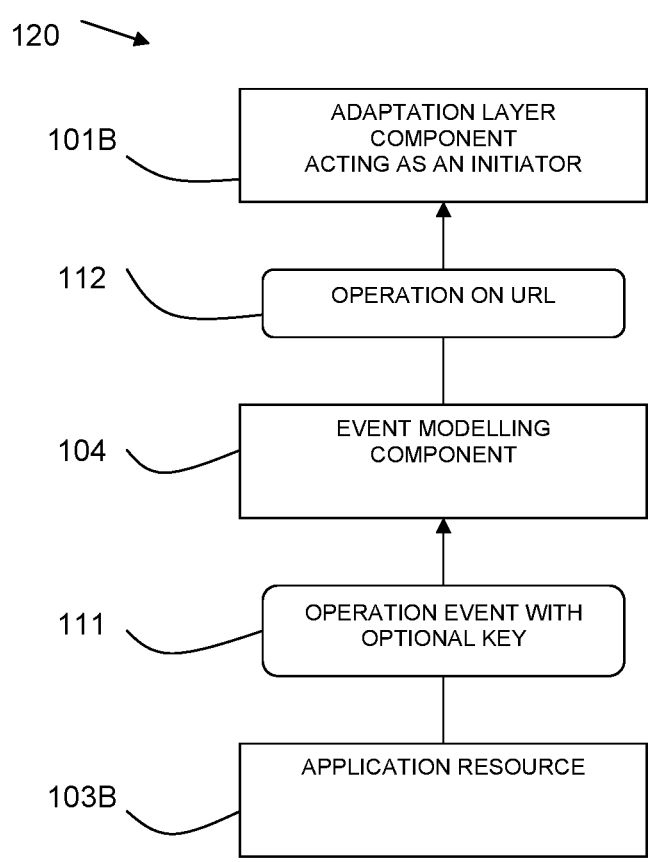

As will be appreciated by one skilled in the art, aspects of the present invention may be embodied as a system, method or computer program product. Accordingly, aspects of the present invention may take the form of an entirely hardware aspect, an entirely software aspect (including firmware, resident software, micro-code, etc.) or an aspect combining software and hardware aspects that may all generally be referred to herein as a "circuit," "module," or "system." Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain (or store) a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to aspects of the invention. Each block of the flowchart illustrations and/or block diagrams, and combinations of blocks in the flowchart illustrations and/or block diagrams, can be implemented using computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

REST is a well understood paradigm and design point for modeling resources using HTTP (Hypertext Transfer Protocol) as a protocol for interacting with those resources. Each resource is represented by a URL (Uniform Resource Locator), and the standard four verbs available via HTTP provide a means of creating, reading, updating and deleting (CRUD operations) these resources via POST, GET, PUT and DELETE respectively.

The described method and system apply the REST principal to business data and extend the notion to events about data changes in a system (and not just about the explicit manipulation of data in a system) to provide a hybrid data and messaging system to simplify integration and propagation of data between systems. This is achieved by providing a common syntax and semantics to resources in separate systems, and providing a canonical means of addressing resources. This results in a trivial integration process in the most optimal scenarios, and a much simpler integration in more complex scenario The described method and system are particularly suited to hybrid cloud integration scenarios, where the execution of this could be distributed across these topologies in a deployment agnostic way. A user would like to simply link two systems together, regardless of which types they are, and have data flow from one to the other with a standard, well understood behavior, and little or no mediation logic between them.

Each system is modeled as a RESTful collection of resources to represent the particular data objects that are to be integrated. For example, if customer records are of interest in a database, then these are exposed as a set of REST resources. The identifying part of the URL for each resource is the key of that record. If the database is the controlling repository in the integration relationship, then the key is the Primary Key (PK). If it were the controlled repository, it would be the Foreign Key (FK).

This is achieved by providing an adaptation layer to act as the HTTP facade to represent these REST resources. The adaptation layer is created for the particular data schema of the data in question. The adaptation layer is, itself, a REST resource that can be created by POSTing the schema to describe the data it is to represent.

The creation of an adaptation layer is achieved by exposing the metadata about the system data as REST resources, that are exposed through a base metadata adaptation layer (created with the schema for metadata representation e.g., XML (eXtensible Markup Language) Schema—xml.xsd). An additional property may be set on the creation of an adaptation layer to specify the field in the schema that is to be used as the key identifier for the resource. Without specifying this, the natural PK would be used, otherwise the specified FK is used Therefore, metadata can be retrieved in a standard form, over a standard protocol, to describe the available types of resource, and these resource instances can then be created and accessed.

The notion of "initiator" and "provider" adaptation layer components are introduced as particular roles that the adaptation layer is created to satisfy. A provider adaptation layer component is configured to provide access to data resources in the system it is for, in a standard way. It consists of an HTTP listener that receives GET/PUT/POST/DELETE requests for particular URLs and then performs the appropriate actions on the actual system in the native protocol to create, read, update and delete data objects. The identity part of the URL is the key by which the resource is being addressed.

An initiator adaptation layer component is configured to emit events that correspond to changes in data in the owning system, using the same HTTP REST semantics. However, the semantics will be applied based on the context of whether this initiating system is the controlling system or controlled system in the relationship.

If the initiating system is the controlling system, when a record is created, the record's primary key (which is the identifying part of the URL scheme for the resource) is already known when the event is propagated to the adaptation layer. Therefore, the adaptation layer knows that a resource has been created at a known URL. The semantics of REST are that this maps to a PUT issued to that known URL.

However, if the initiating system were the controlled system, the record's foreign key (which is being used as the identifying part of the URL scheme in this instance) is blank because this must be supplied by the controlling system. The semantics of this in REST is that a resource is being created at an unknown URL, and it is the responsibility of the target system to identify the resource when created—this maps to a POST to the URL of a collection. More simply, a retrieve or delete operation will directly map to the GET or DELETE verbs to specific URLs.

A manner of "hooking" these adaptation layer components together is provided by an additional property of the adaptation layer resource itself. When a provider adaptation layer is created, a URL to the collection it represents is returned as the state of the adaptation layer resource. When creating an initiator adaptation layer, no such URL is provided for obvious reasons. However, a property to denote a "destination" for an initiator adaptation layer can be set to indicate where these emitted HTTP verbs should be targeted to. The URL of the provider adaptation layer's collection address can be set as the destination of the initiator adaptation layer. Hence, when a data change event occurs on the originating system, this has the result of a corresponding copy of the REST resource represented is "mirrored" to the destination collection.

For scenarios where the data schema for the resources are the same on both sides—all protocol and operational semantics are automatically dealt with. However, for scenarios involving different schema, an additional intermediary adaptation layer component can be inserted that represents a mapping. This intermediary component is created by specifying the schema for the map (e.g. XSLT (eXtensible Stylesheet Language Transformations), and presents a URL to represent a "virtualized" collection of resources on one side, and a destination to the real resource collection being virtualized on the other side. The three forms of adaptation layer can then be streamed together, and the HTTP messages and operations cascade automatically from the originating system to the target system.

A further aspects of the described system allows for multiple destinations on an initiating or intermediary adaptation layer component to facilitate multicasting of these events.

In the situations where a controlled system is the initiating adaptation layer component, and a record is created in that system, the resultant PK created by the controlling (provider) adaptation layer must be propagated back. REST stipulates that state is returned after the operation—so this updated state will naturally propagate back in the HTTP response message of the initiator adaptation layer component. The adaptation layer then performs a subsequent update operation on the system to reflect this update to PK as FK into the record.

The adaptation layer can provide encapsulation of communication/session management details for a resource (requester or provider) endpoint, including isolation of adaptation layer integrations from actual changes in endpoint/connectivity details. A common interface can also be provided to simplify integrations using the well understood REST protocol and operational semantics to manipulate a resource exposed by the adaptation layer. The concept of pipes involves encapsulating the relationship between at least two adaptation layer components and optionally a mediation in order to flow data from one adaptation layer component to another.

The following terminology is used in the description given below. The roles of the adaptation layer component includes Initiator, Provider and Intermediary. The Initiator initiates an integration by propagating an initial message into SL. The Provider is used as a target for messages in an integration. The Intermediary acts as a forwarding proxy and can act as an Initiator and Provider.

An adaptation layer component status includes a read-only entry aspect giving status details of the adaptation layer component instance. This includes the URL for where messages should be sent to that adaptation layer component (the Req.in endpoint URL). An adaptation layer component destination includes a destination entry that encapsulates where messages should be forwarded on to (Req.out URL) by the adaptation layer component after receipt on the Req.in URL. An adaptation layer component type includes a logical grouping of resources provided by a common provider (e.g. SaaS service, database, file, etc). An adaptation layer component instance includes an instantiation of an adaptation layer component that exposes a RESTful endpoint for a particular resource on its Req.in URL and maps this to the appropriate interactions with the resource, and potentially forwarding on to any destination endpoints.

A pipe is an integration between at least two adaptation layer components, with an optional mediation between them. The pipe is a recording of this relationship. A resource is the thing being manipulated behind the adaptation layer component—an object in a database, a spreadsheet, business object in a service, etc.

Referring to FIG. 1A, a block diagram shows a system 110 for a provider adaptation layer. An adaptation layer component 101A acting as a provider is provided in the form of an HTTP server which exposes REST resources over HTTP. The adaptation layer component 101A acting as a provider includes an HTTP listener for receiving operation requests for particular URLs. A resource modeling component 102 in the form of an application type plugin models application resources 103 as REST resources. An operation on a URL 112 may be received by the adaptation layer component 101A acting as a provider. The adaptation layer component 101A sends the URL path information 113 to the resource modelling component 102 which sends an operation event with optional key 114 to the relevant application resource 103A.

Referring to FIG. 1B, a block diagram shows a system 120 for an initiator adaptation layer. An adaptation layer component 101B acting as an initiator is provided in the form of an HTTP server which exposes REST resources over HTTP. An event modelling component 104 in the form of an application type plugin models application resource 103 events as REST resource operations. An operation event with optional key 111 is generated by an application resource 103B and sent to the event modelling component 104 which provides the operation on URL 112 to the adaptation layer component 101B acting as an initiator.

Figure 1C:
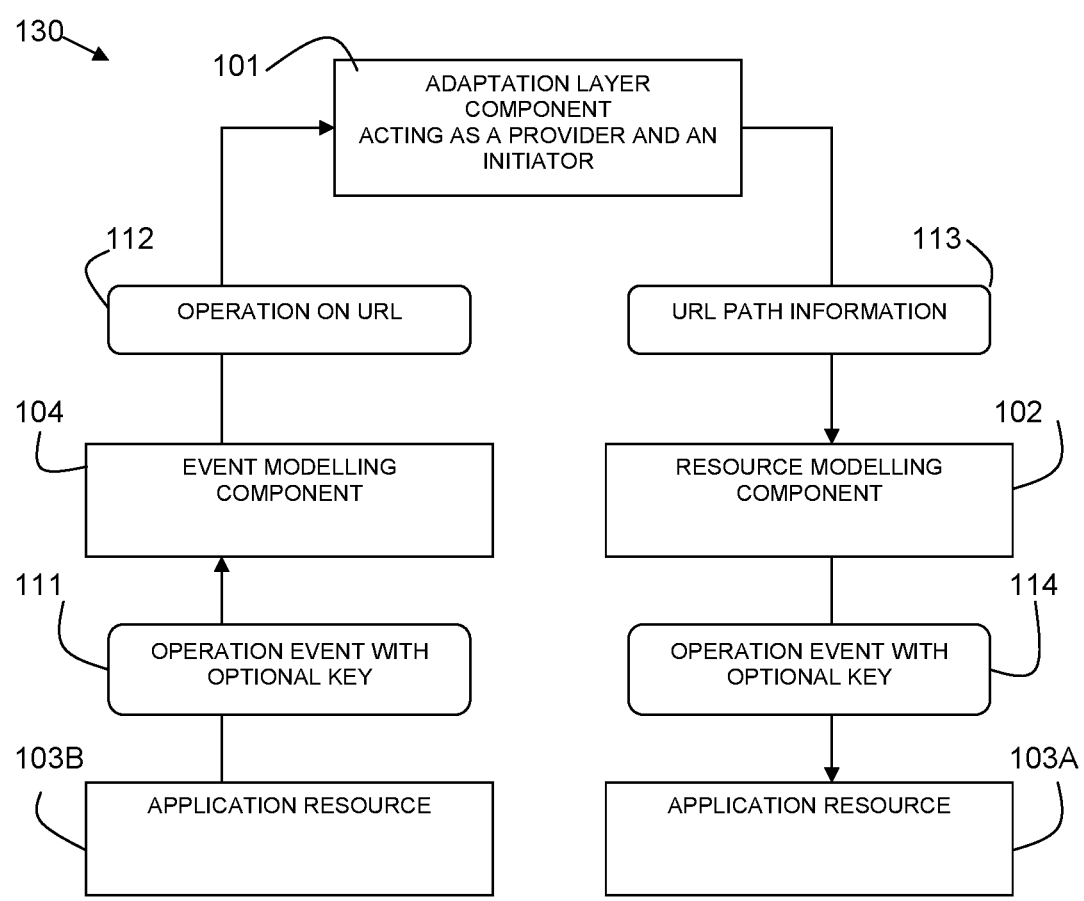

Referring to FIG. 1C, a block diagram shows a system 130 with integrated initiator and provider adaptation layer. An adaptation layer component 101 is provided in the form of an HTTP server acting as an initiator and a provider. An application resource 103B may generate an operation event with optional key 111 and sends it to the event modelling component 104 which provides the operation on URL 112 to the adaptation layer component 101. The adaptation layer component 101 sends the URL path information 113 to the resource modelling component 102 which sends an operation event with optional key 114 to the application resource 103A.

Figure 2A:
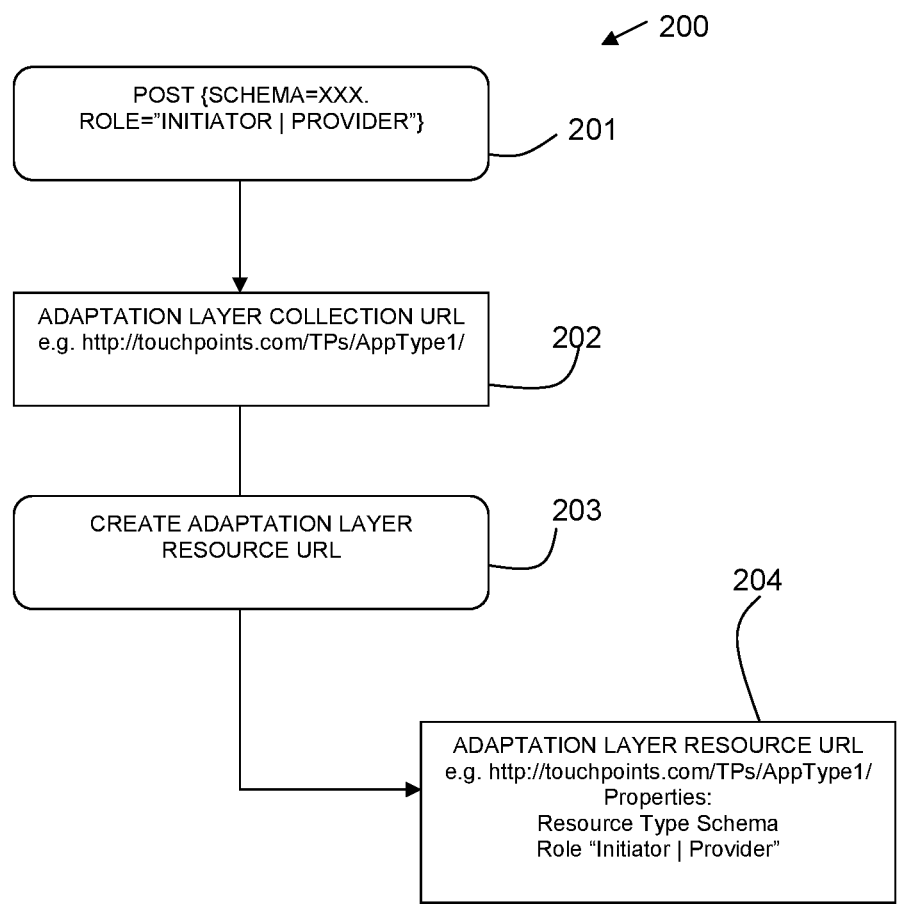

In the following examples, the adaptation layer is referred to as "Touchpoint" and this name is used in example URLs. Referring to FIG. 2A, a method of adaptation layer component creation 200 is shown.

A POST operation 201 is provided for POST {Schema=xxx, Role="Initiator|Provider"}. An adaptation layer collection URL 202 is provided, for example: http://touchpoints.com/TPs/AppType1/.

An adaptation layer resource URL 204 is created 203, for example, http://touchpoints.com/TPs/AppType1/TP1/ with Properties: Resource Type Schema; and Role: "Initiator|Provider".

Figure 2B:
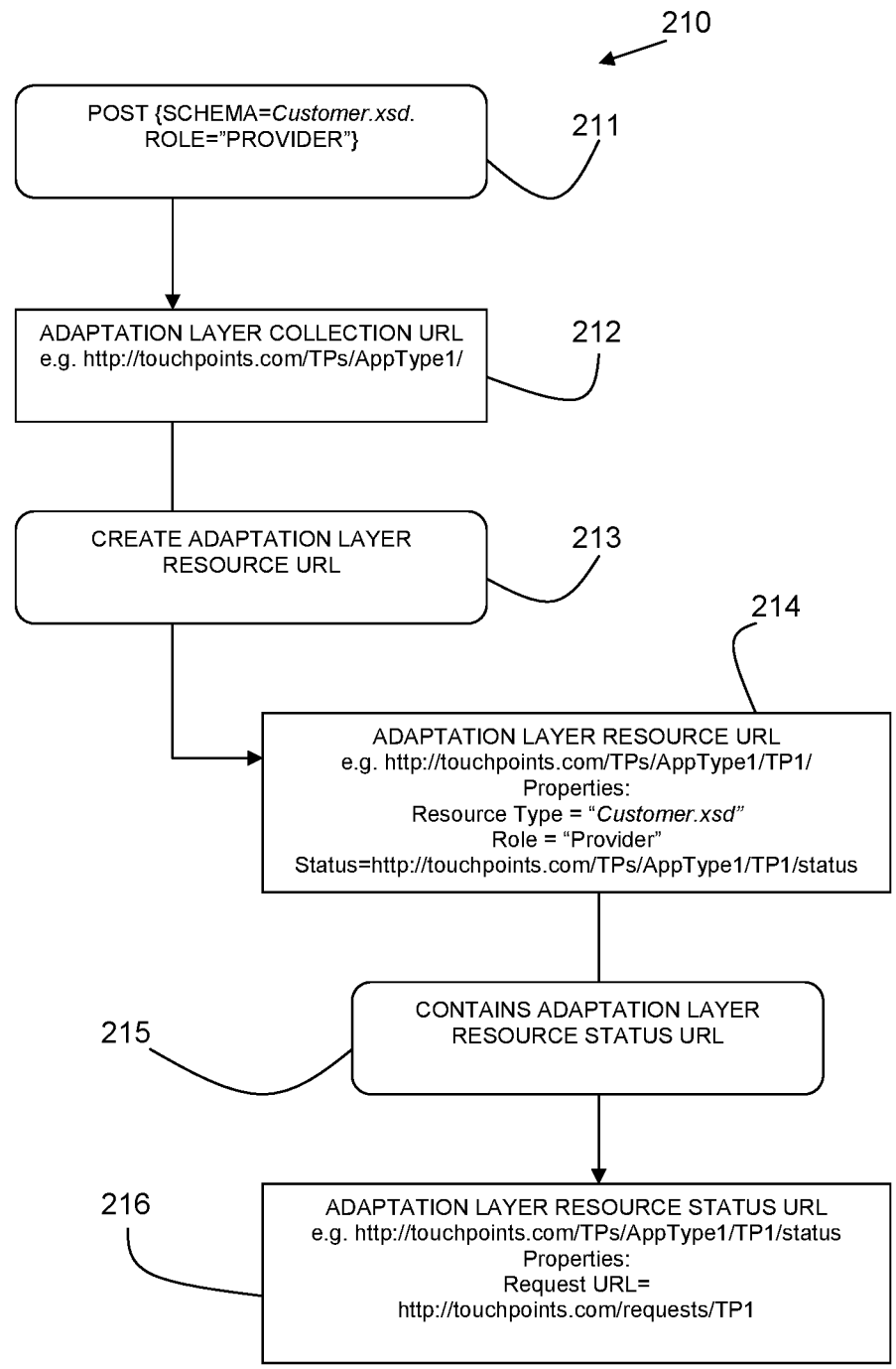

Referring to FIG. 2B, a method of adaptation layer component creation for a provider role 210 is shown.

A POST operation 211 is provided for POST {Schema=Customer.xsd, Role="Provider"}. An adaptation layer collection URL 212 is provided, for example: http://touchpoints.com/TPs/AppType1/.

An adaptation layer resource URL 214 is created 213, for example, http://touchpoints.com/TPs/AppType1/TP1/ with Properties: Resource Type="Customer.xsd"; Role: "Provider"; Status=http://touchpoints.com/TPs/AppType1/TP1/status.

The adaptation layer resource URL 214 contains 215 an adaptation layer resource status URL 216, for example, http://touchpoints.com/TPs/AppType1/TP1/status, with Properties: Request URL=http://touchpoints.com/requests/TP1.

Referring to FIG. 2C, a method of adaptation layer component creation for an initiator role 220 is shown.

A POST operation 221 is provided for POST {Schema=Customer.xsd, Role="Initiator"}. An adaptation layer collection URL 222 is provided, for example: http://touchpoints.com/TPs/AppType2/.

An adaptation layer resource URL 223 is created 224, for example, http://touchpoints.com/TPs/AppType2/TP2/" with Properties: Resource Type="Customer.xsd"; Role: "Initiator"; Destination=http://touchpoints.com/TPs/AppType2/TP2/dest.

The adaptation layer resource URL 223 contains 225 an adaptation layer resource destination URL 226, for example, http://touchpoints.com/TPs/AppType2/TP2/dest, with Properties: Request URL=http://touchpoints.com/requests/TP1.

A POST operation 227 provided for {Request=http://touchpoints.com/requests/TP1} is posted to the adaptation layer resource destination URL 226.

Referring to FIGS. 3A to 3D, flow diagrams show provider adaptation layer operations.

Figure 3A:
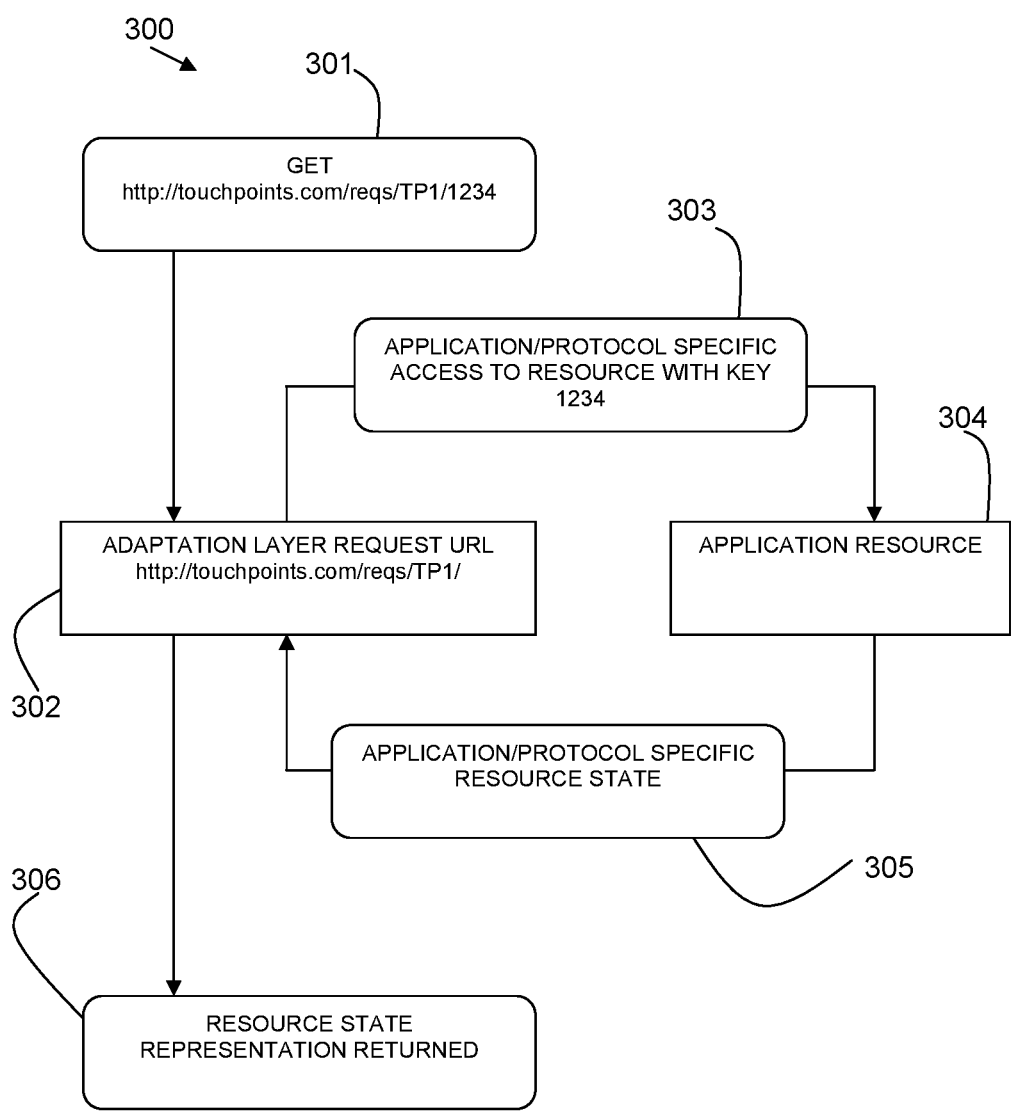
FIGS. 3A to 3D are schematic flow diagrams of provider adaptation layer component operations.

In FIG. 3A, a flow diagram 300 shows a provider GET operation 301, for example, GET http://touchpoints.com/reqs/TP1/1234, to an adaptation layer request URL 302, for example, http://touchpoints.com/reqs/TP1/. An application/protocol specific access is carried out 303 to application resource with key "1234" 304. The application resource responds 305 with an application/protocol specific resource state to the adaptation layer request URL 302 which returns 306 the resource state representation.

Figure 3B:
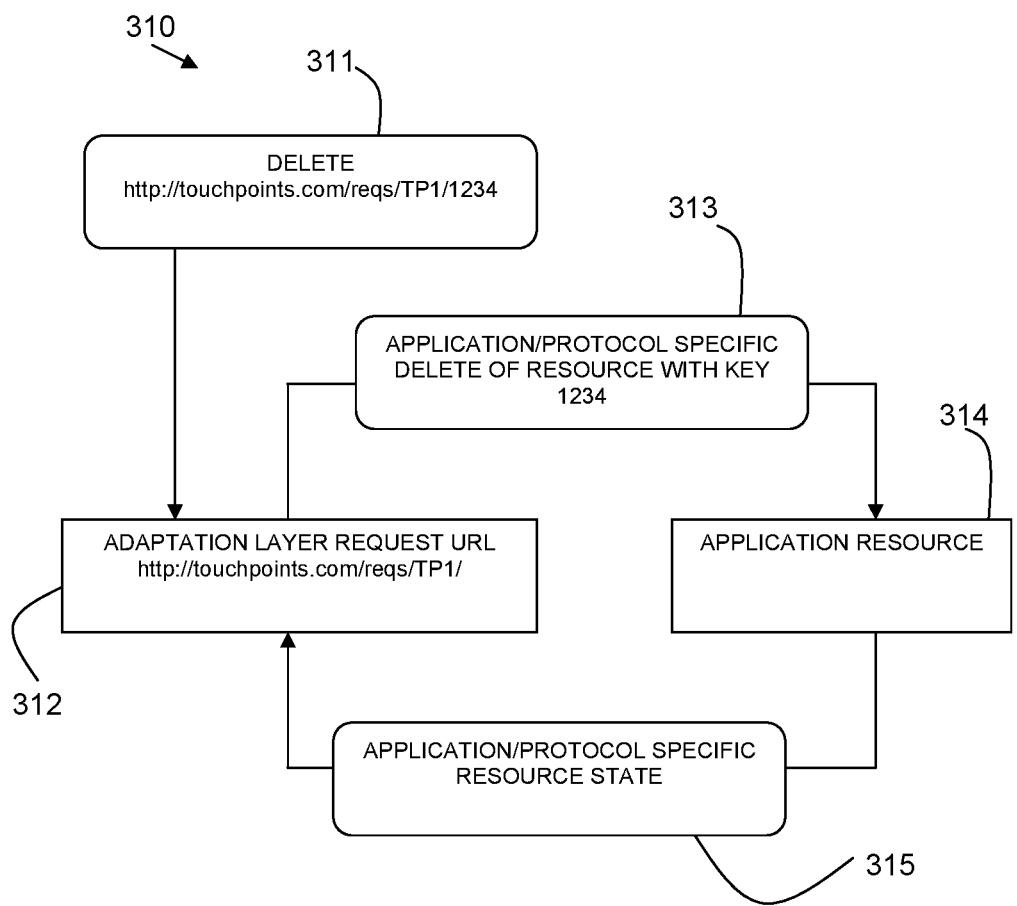

In FIG. 3B, a flow diagram 310 shows a provider DELETE operation 311, for example, DELETE http://touchpoints.com/reqs/TP1/1234, to an adaptation request server URL 312, for example, http://touchpoints.com/reqs/TP1/. An application/protocol specific delete is carried out 313 to resource with key "1234" 314. The application resource responds 315 with an application/protocol specific resource state to the adaptation request server URL 312.

Figure 3C:
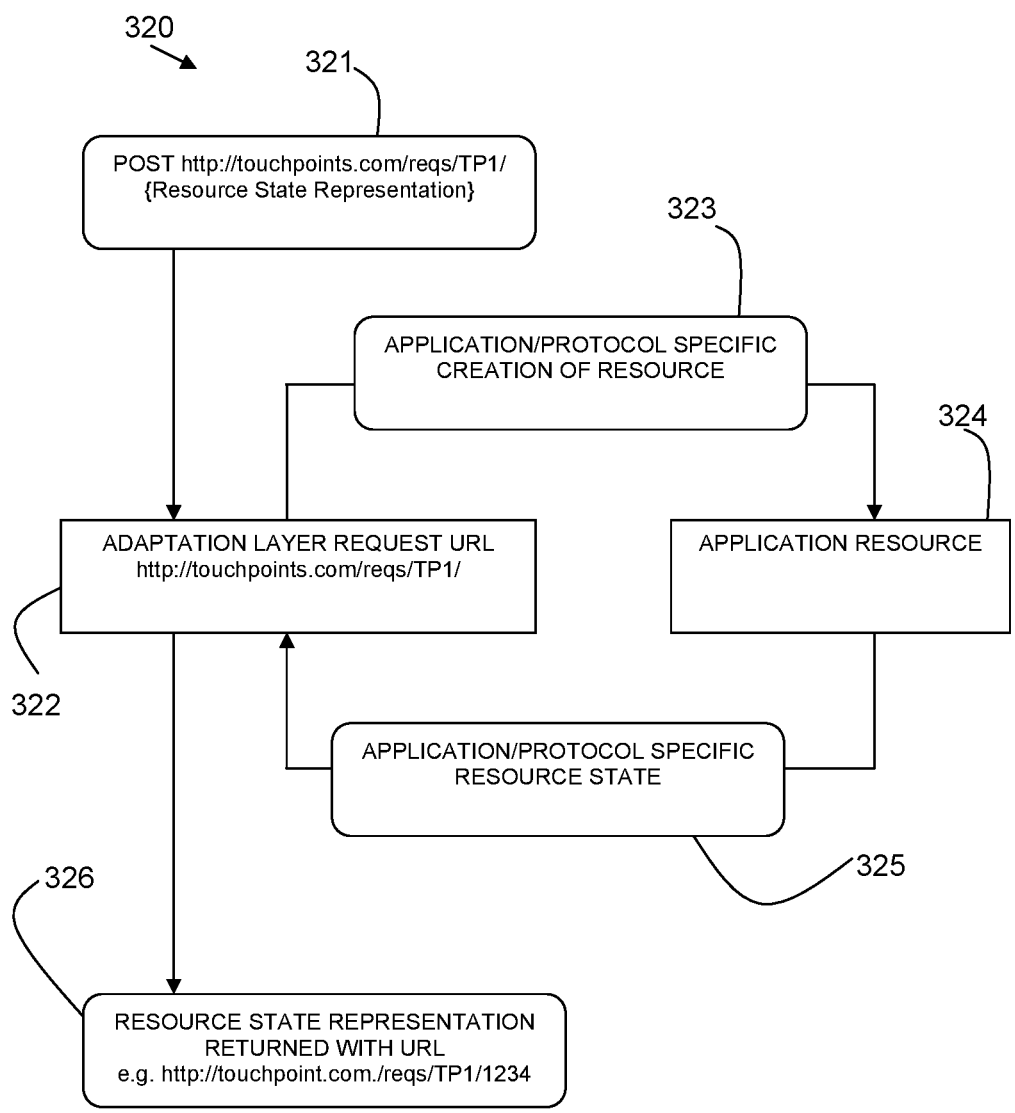

In FIG. 3C, a flow diagram 320 shows a provider POST operation 321, for example, POST http://touchpoints.com/reqs/TP1/ {Resource State Representation}, to an adaptation request server URL 322, for example, http://touchpoints.com/reqs/TP1/. An application/protocol specific creation of resource is carried out 323 to resource 324. The application resource responds 325 with an application/protocol specific resource state to the adaptation request server URL 322 which returns 326 the resource state representation, for example, http://touchpoints.com/reqs/TP1/1234.

Figure 3D:
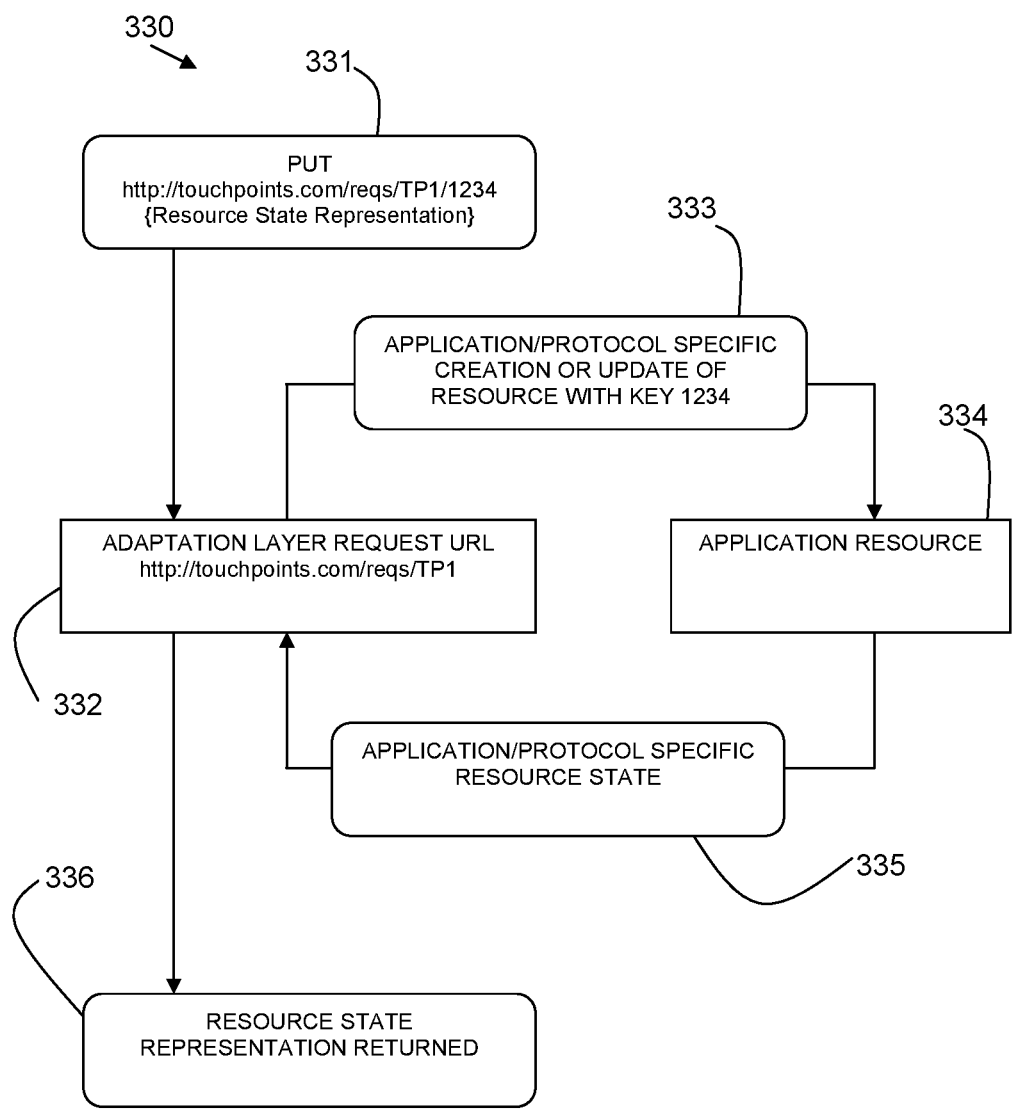

In FIG. 3D, a flow diagram 330 shows a provider PUT operation 331 to create or update and existing resource, for example, to PUT http://touchpoints.com/reqs/TP1/1234 {Resource State Representation}, to an adaptation request server URL 332, for example, http://touchpoints.com/reqs/TP1/. An application/protocol specific creation or update of resource with key 1234 is carried out 333 to resource 334. The application resource responds 335 with an application/protocol specific resource state to the adaptation request server URL 332 which returns 336 the resource state representation.

Figure 4A:
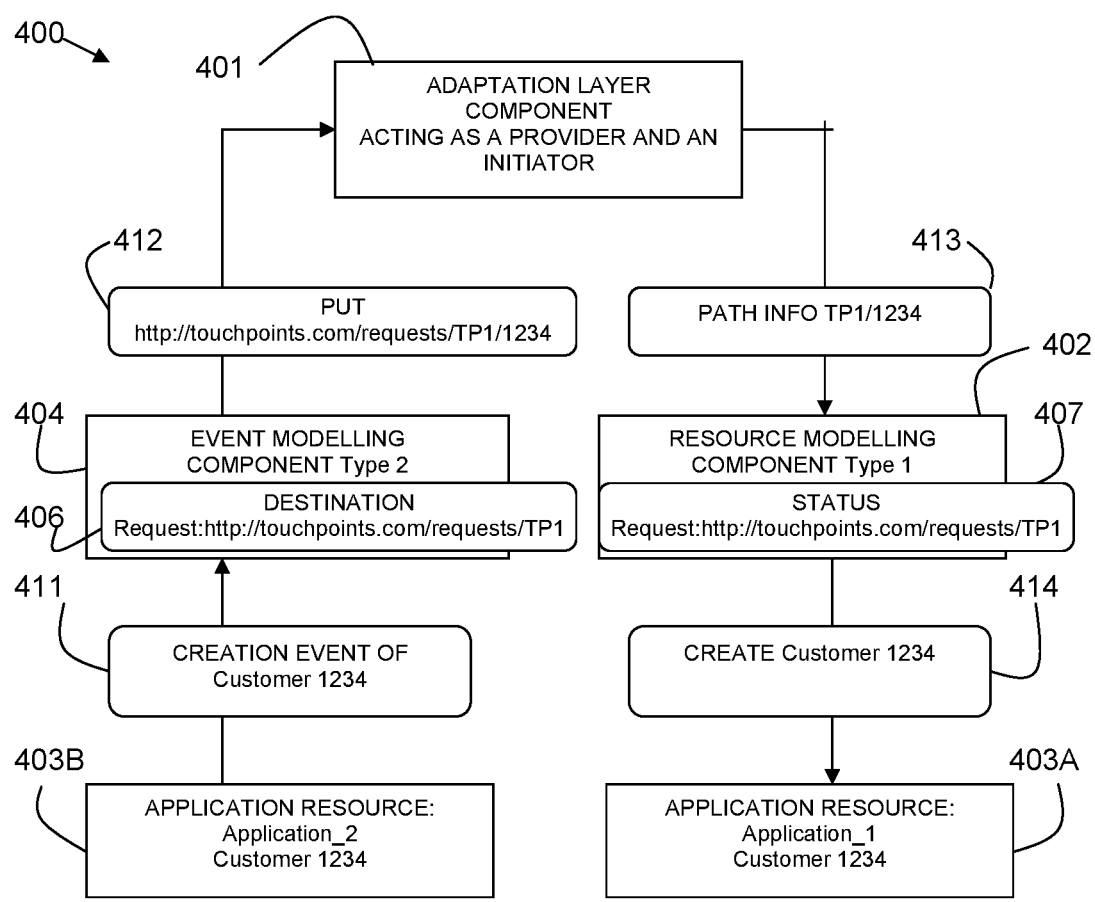
FIGS. 4A to 4C are schematic flow diagrams of integrated initiator and provider adaptation layer components.
Figure 4B:
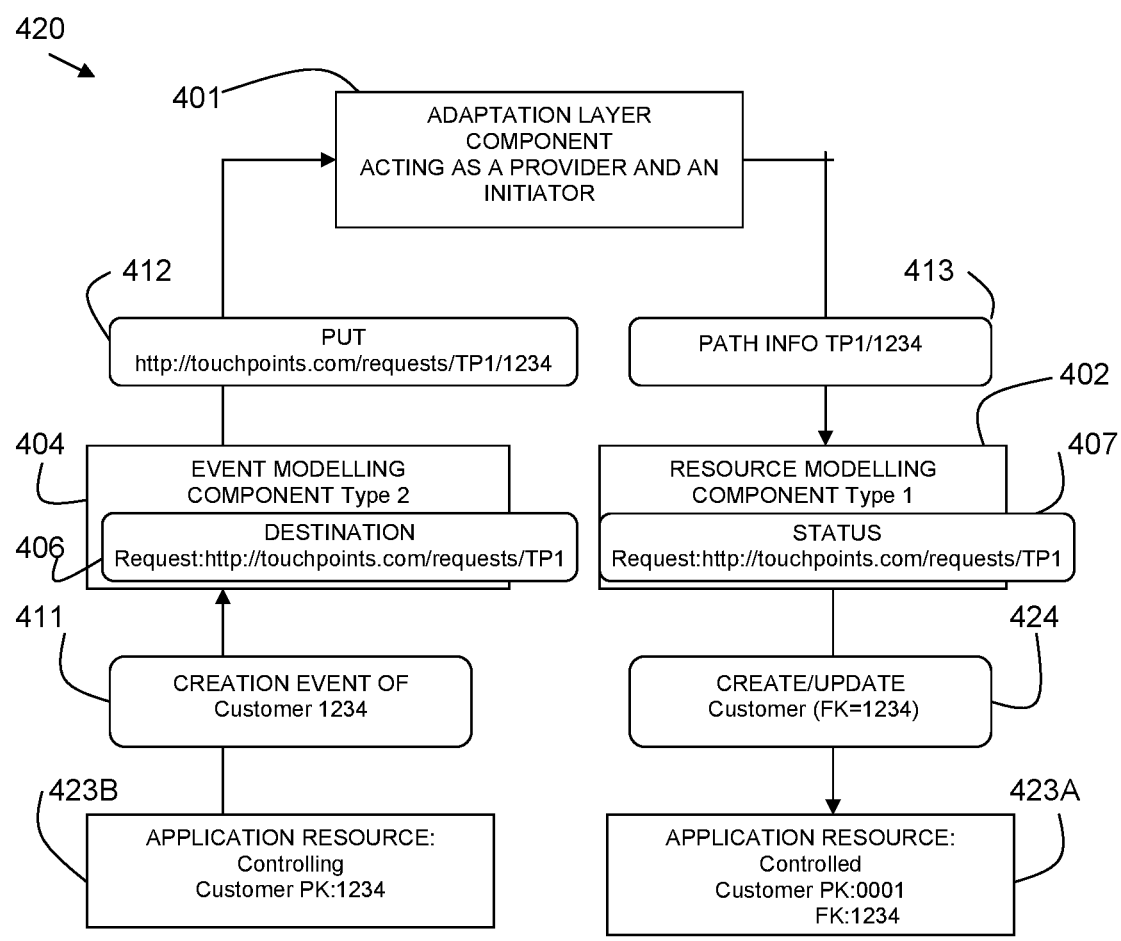
Figure 4C:
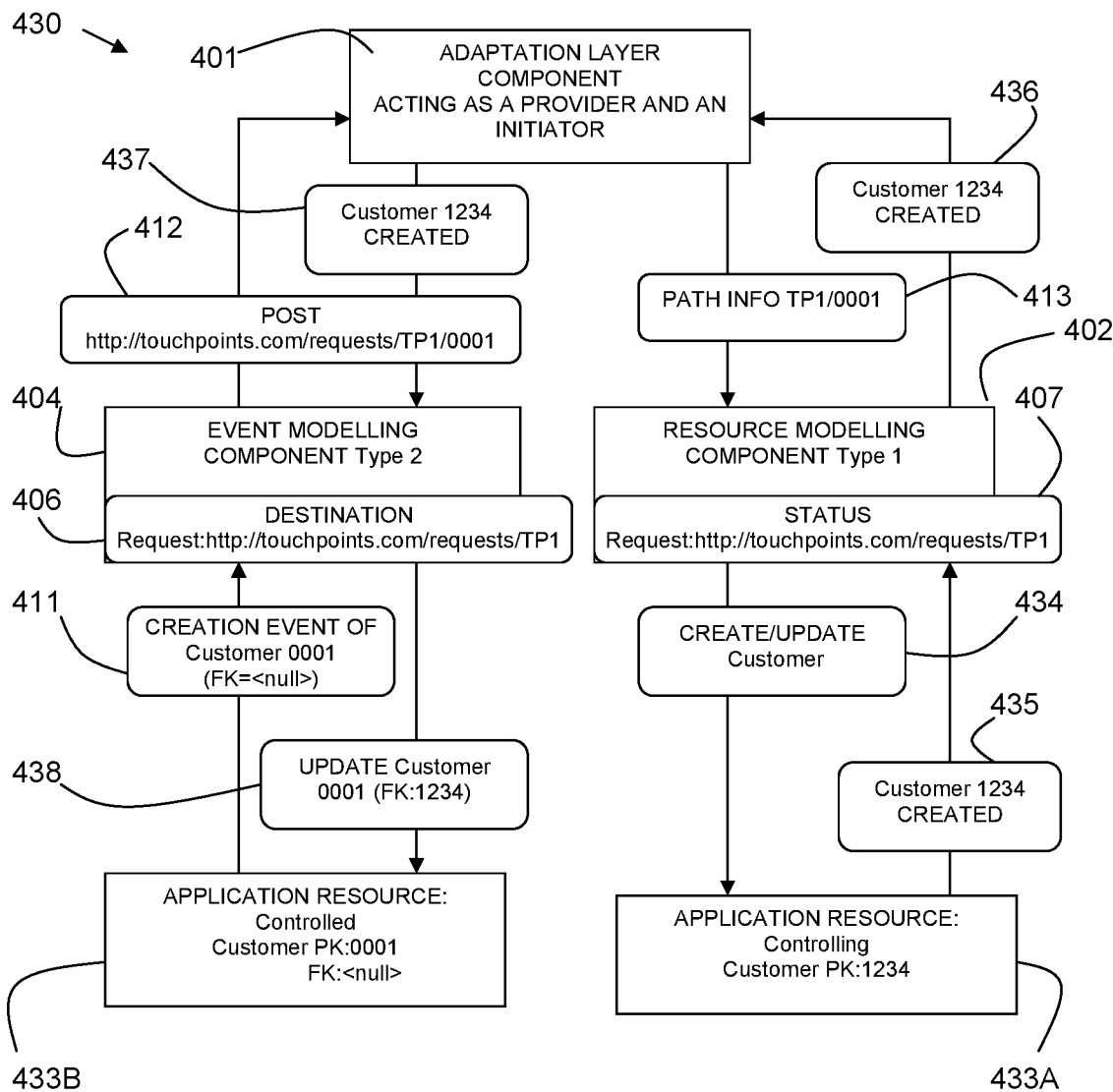

Referring to FIGS. 4A to 4C, flow diagrams 410, 420, 430 are shown of integrated initiator and provider adaptation layer components.

In FIG. 4A, a flow diagram 400 shows integrated initiator and provider components. An event is created 411 of Customer 1234 at an application resource 403B referred to as Application_2. An event modelling component 404 is provided for an application Type 2 with a Destination 406 of "Request: http://touchpoints.com/requests/TP1". A PUT operation 412 (for example, PUT http://touchpoints.com/requests/TP1/1234) is made from the event modelling component 404 to an adaptation layer component acting as a provider and an initiator 401. The adaptation layer component 401 sends 413 Path information TP1/1234 to resource modelling component 402 for an application Type 1 which has a Status 407 of "Request: http://touchpoints.com/requests/TP1". A Create Customer 1234 operation 414 is carried out at an application resource 403A referred to as Application_1 to create a record for Customer 1234.

Referring to FIG. 4B, a flow diagram 410 shows integrated initiator and provider components supporting controlling system to controlled system integration. The flow diagram is the same as in FIG. 4A with the exception that the application resource 423B which creates event 1234 411 is controlling with a private key of 1234. The resource modelling component 402 creates or updates 424 Customer with foreign key 1234. Application resource 423A is controlled with Customer private key 0001 and foreign key 1234.

Referring to FIG. 4C, a flow diagram 430 shows integrated initiator and provider components supporting controlled system to controlling system integration. The flow diagram is the same as in FIG. 4A with the exception that the application resource 433B is a controlled system with a Customer private key of 0001 and foreign key <null>. The application resource 433B creates 431 an event of Customer 0001 with foreign key <null>. A POST operation 412 is made by the event modeling component 404 to the adaptation layer component 401. The resource modelling component 402 creates or updates 434 a resource Customer. Application resource 433A is a controlling system which allocates a Customer private key 1234.

A return path is provided from the controlling application resource 433A to the controlled application resource 433B. Creation of Customer 1234 is returned 435, 436, 437 via the resource modelling component 402 to the adaptation layer component 401 and to the event modelling component 404. The event modelling component 404 updates 438 Customer 0001 with foreign key 1234 at the controlled application resource 433B.

In data propagation, (at least) one party must act as the controlling system—i.e. own the primary key (PK) by which they will subsequently know the resource. The adaptation layer component will use that primary key as the resource identity key. The controlled system must have a foreign key (FK) identified within its native schema, and this will be the resource identity key in REST terms. The adaptation layer component will use that foreign key as the resource identity key.

On an UPSERT event from its system, an initiator adaptation layer component should look for a value for its resource identity key (this may be PK, or has been specified as FK for this component). If non-null, then this event is a PUT, and if null, then this event is a POST.

If a controlling system acts as initiator, it effectively always does a PUT/PK. As the PK is known, the adaptation layer component can see this should be a PUT. If a controlled system acts as initiator, it does a POST, and will have to PUT an updated copy of its source event afterwards to record the resource identity key. There is the danger of a race condition occurring for controlled system initiations, where the creation of a record in the controlling system results in a trigger event. In this case, the use of foreign keys on both the controlling system and the controlled system can remove the danger of replication errors.

Figure 5A:
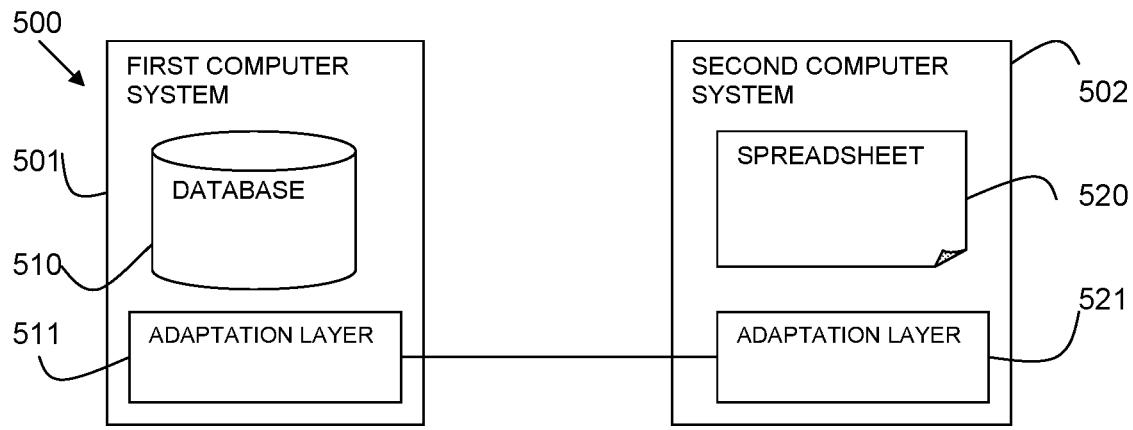
FIGS. 5A and 5B are block diagrams of two aspects of a data synchronization system.
Figure 5B:
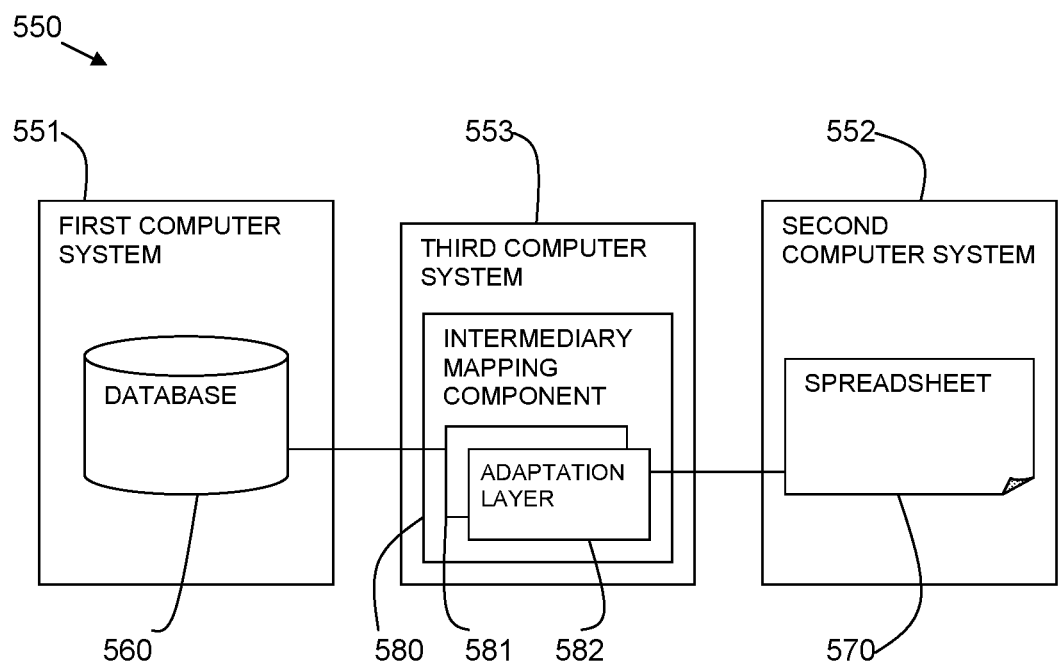

Referring to FIGS. 5A and 5b, example aspects of the described system are shown. In a first aspect shown in FIG. 5A, there is direct communication between resource systems. In this example aspect a system for synchronization 500 is shown between a database 510 provided on a first computer system 501, wherein the database 510 is an example aspect of a controlling resource repository, and a spreadsheet 520 provided on a second computer system 502, wherein the spreadsheet 520 is an example aspect of a controlled resource repository. Adaptation layers 511, 521 reside on each of the first and second computer systems 501, 502 and use an HTTP networking protocol for communication between the adaptation layers 511, 521.

In the second aspect shown in FIG. 5B, a system 550 is shown with a database 560 provided on a first computer system 551, wherein the database 560 is an example aspect of a controlling resource repository, and a spreadsheet 570 provided on a second computer system 552, wherein the spreadsheet 570 is an example aspect of a controlled resource repository. A mapping intermediary component 580 is provided on a third computer system 553 hosting adaptation layers 581, 582. In this aspect, a native protocol exchange is carried out between an adaptation layer 581, 582 and its respective computer system 551, 552.

Figure 6:
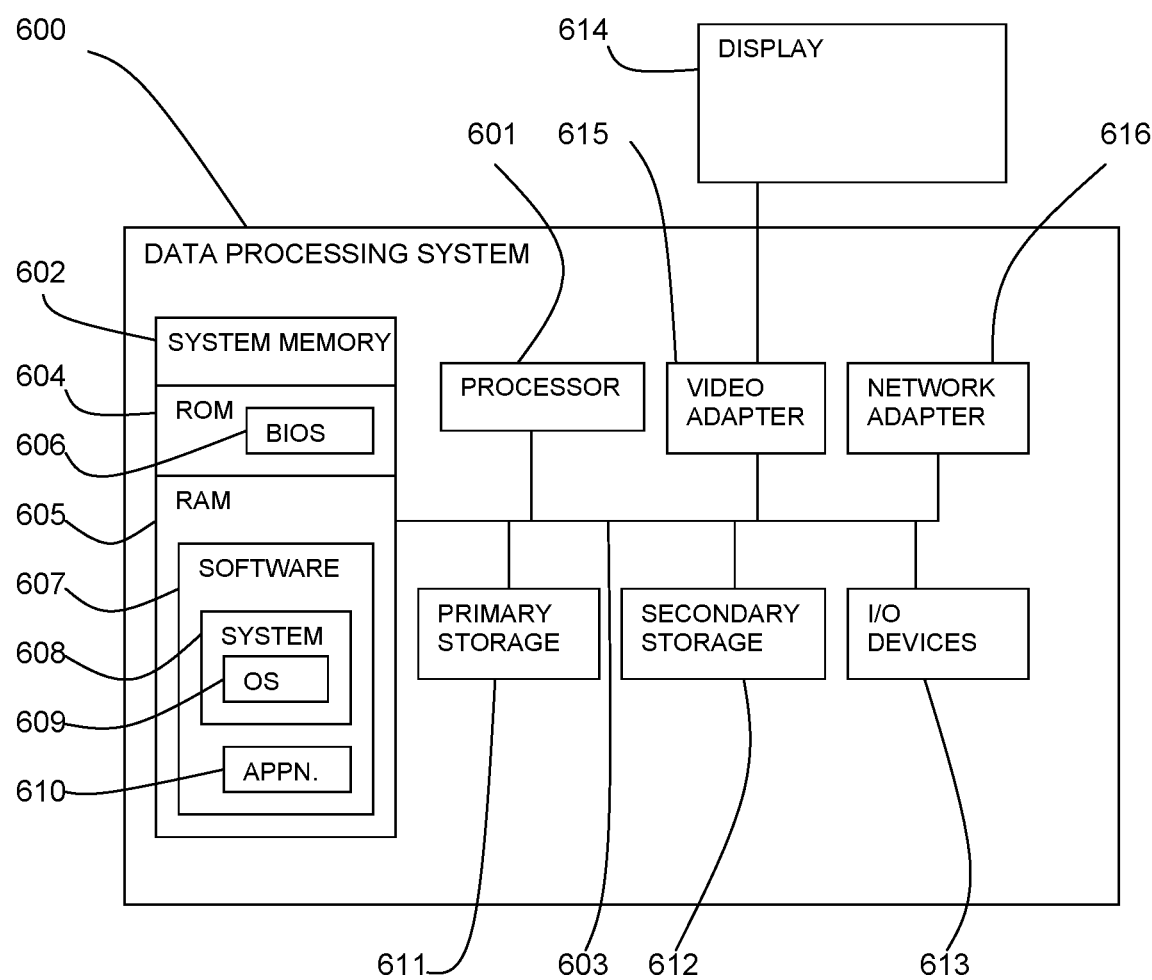
FIG. 6 is a block diagram of a computer system.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements can include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616. Input/output devices 613 can be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

The flowchart and block diagrams in the figures illustrate the architecture, functionality, and operation of possible implementations of systems, methods and computer program products according to various aspects of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the invention. As used herein, the singular forms "a," "an," and "the" are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The aspect was chosen and described in order to best explain the principles of the invention and the practical application, and to enable others of ordinary skill in the art to understand the invention for various aspects with various modifications as are suited to the particular use contemplated.

What is claimed is:

1. A computer-implemented method, within a controlled data system connected to a controlling data system via an event propagation processor, for synchronization of data between the controlled data system and the controlling data system, comprising:
   transmitting, from the controlled data system and to the event propagation processor, an event that corresponds to a change in data initiated within the controlled data system and includes a null foreign key;
   receiving, from the event propagation processor, a resultant record originating from the controlled data system; and
   updating the record within the controlled data system to include a foreign key included in the resultant record, wherein
   the event is transmitted to the controlling data system via the event propagation processor,
   the resultant record including the foreign key is transmitted to the controlled data system via the event propagating processor,
   the change in the data involves a record within the controlled data system, and
   the resultant record is based upon the event being received by the controlling data system.

2. The method of claim 1, wherein
   the record within the controlled data system includes a blank foreign key prior to being updated using the resultant record.

3. The method of claim 1, wherein
   the event propagation processor includes an adaptation layer in the form of an HTTP (Hypertext Transfer Protocol) facade to represent REST resources,
   the adaptation layer is separate from the controlled data system and the controlling system
   the adaptation layer includes a provider component and an initiator component.

4. The method of claim 3, wherein
   the initiator component transmits the event to the controlling data system.

5. The method of claim 1, wherein
   the adaptation layer is configured for a particular data schema of the controlled and controlling data systems.

6. The method of claim 5, wherein
   the adaptation layer is a REST resource and configured by the particular data schema using POSTing.

7. The method of claim 1, wherein
   the adaptation layer is configured by exposing metadata, about the controlled and controlling data systems, through a base metadata layer.

8. A computer hardware system including a controlled data system is connected to a controlling data system via an event propagation processor, for synchronization of data between the controlled data system and the controlling data system, comprising:
   a hardware processor configured to initiate the following executable operations:
   transmitting, from the controlled data system and to the event propagation processor, an event that corresponds to a change in data initiated within the controlled data system and includes a null foreign key;
   receiving, from the event propagation processor, a resultant record originating from the controlled data system; and
   updating the record within the controlled data system to include a foreign key included in the resultant record, wherein
   the event is transmitted to the controlling data system via the event propagation processor,
   the resultant record including the foreign key is transmitted to the controlled data system via the event propagating processor,
   the change in the data involves a record within the controlled data system, and
   the resultant record is based upon the event being received by the controlling data system.

9. The system of claim 8, wherein
   the record within the controlled data system includes a blank foreign key prior to being updated using the resultant record.

10. The system of claim 8, wherein
    the event propagation processor includes an adaptation layer in the form of an HTTP (Hypertext Transfer Protocol) facade to represent REST resources,
    the adaptation layer is separate from the controlled data system and the controlling system
    the adaptation layer includes a provider component and an initiator component.

11. The system of claim 10, wherein
    the initiator component transmits the event to the controlling data system.

12. The system of claim 8, wherein
    the adaptation layer is configured for a particular data schema of the controlled and controlling data systems.

13. The system of claim 12, wherein
    the adaptation layer is a REST resource and configured by the particular data schema using POSTing.

14. The system of claim 8, wherein
    the adaptation layer is configured by exposing metadata, about the controlled and controlling data systems, through a base metadata layer.

15. A computer program product, comprising:
    a computer hardware storage device having stored therein computer usable program code for synchronization of data between a controlled data system and a controlling data system via an event propagation processor,
    the computer usable program code, which when executed on a computer hardware system including the controlled data system, causes the computer hardware system to perform:
    transmitting, from the controlled data system and to the event propagation processor, an event that corresponds to a change in data initiated within the controlled data system and includes a null foreign key;
    receiving, from the event propagation processor, a resultant record originating from the controlled data system; and
    updating the record within the controlled data system to include a foreign key included in the resultant record, wherein
    the event is transmitted to the controlling data system via the event propagation processor,
    the resultant record including the foreign key is transmitted to the controlled data system via the event propagating processor,
    the change in the data involves a record within the controlled data system, and the resultant record is based upon the event being received by the controlling data system.

16. The computer program product of claim 15, wherein the record within the controlled data system includes a blank foreign key prior to being updated using the resultant record.

17. The computer program product of claim 15, wherein the event propagation processor includes an adaptation layer in the form of an HTTP (Hypertext Transfer Protocol) facade to represent REST resources, the adaptation layer is separate from the controlled data system and the controlling system the adaptation layer includes a provider component and an initiator component.

18. The computer program product of claim 17, wherein the initiator component transmits the event to the controlling data system.

19. The computer program product of claim 15, wherein the adaptation layer is configured for a particular data schema of the controlled and controlling data systems.

20. The computer program product of claim 19, wherein the adaptation layer is a REST resource and configured by the particular data schema using POSTing.

\* \* \* \* \*